(12) United States Patent
Meeks et al.

(10) Patent No.: US 10,557,695 B2
(45) Date of Patent: Feb. 11, 2020

(54) COMPOSITE MATERIAL HAVING AN INTERNAL SKELETON STRUCTURE

(71) Applicant: Amaranthine Resources, LLC, Reno, NV (US)

(72) Inventors: Henry S. Meeks, Reno, NV (US); Jonathan Meeks, Sparks, NV (US)

(73) Assignee: Amaranthine Resources, LLC, Reno, NV (US)

( * ) Notice: Subject to any disclaimer, the term of this patent is extended or adjusted under 35 U.S.C. 154(b) by 0 days.

(21) Appl. No.: 15/371,762

(22) Filed: Dec. 7, 2016

(65) Prior Publication Data

US 2017/0160063 A1 Jun. 8, 2017

Related U.S. Application Data

(60) Provisional application No. 62/263,738, filed on Dec. 7, 2015.

(51) Int. Cl.

| *B22F 3/17* | (2006.01) |
|---|---|
| *F42B 12/24* | (2006.01) |
| *B22F 3/04* | (2006.01) |
| *B22F 3/24* | (2006.01) |
| *B22F 7/00* | (2006.01) |
| *B22F 7/08* | (2006.01) |
| *B28B 3/02* | (2006.01) |
| *B32B 3/26* | (2006.01) |
| *B32B 9/00* | (2006.01) |
| *B32B 15/04* | (2006.01) |
| *F42B 12/76* | (2006.01) |

(52) U.S. Cl.
CPC ............... *F42B 12/24* (2013.01); *B22F 3/04* (2013.01); *B22F 3/17* (2013.01); *B22F 3/24* (2013.01); *B22F 7/008* (2013.01); *B22F 7/08* (2013.01); *B28B 3/025* (2013.01); *B32B 3/26* (2013.01); *B32B 9/005* (2013.01); *B32B 15/04* (2013.01); *F42B 12/76* (2013.01); *B22F 2003/247* (2013.01); *B22F 2301/052* (2013.01); *B22F 2301/058* (2013.01); *B22F 2301/20* (2013.01)

(58) Field of Classification Search
None
See application file for complete search history.

(56) References Cited

U.S. PATENT DOCUMENTS

| 4,017,480 | A | 4/1977 | Baum |
|---|---|---|---|
| 5,143,540 | A | 9/1992 | Pyzik et al. |
| 5,588,477 | A * | 12/1996 | Sokol .................... B22D 19/14 164/34 |
| 6,228,481 | B1 | 5/2001 | Yamada et al. |
| 6,599,466 | B1 | 7/2003 | Moxson et al. |
| 6,635,357 | B2 | 10/2003 | Moxson et al. |
| 6,852,273 | B2 | 2/2005 | Ivanov et al. |
| 8,535,604 | B1 | 9/2013 | Baker et al. |
| 8,679,651 | B1 * | 3/2014 | Ramachandran ....... F28D 15/02 428/688 |
| 2014/0007983 | A1 * | 1/2014 | Prest ................. B22D 19/0081 148/403 |

OTHER PUBLICATIONS

International Search Report and Written Opinion, PCT/US2016/065316, dated Apr. 5, 2017 (15 pp.).

* cited by examiner

*Primary Examiner* — Adam Krupicka
(74) *Attorney, Agent, or Firm* — Holland & Hart, LLP (57) ABSTRACT

A skeletal composite material includes an internal skeleton structure surrounded by a matrix material. The skeleton structure and the matrix are made of different materials having different properties. It should be appreciated that the skeleton structure and the matrix can be made of any suitable material including metal, ceramic, carbon, polymers, or combinations of these materials. Preferably, the skeleton structure and/or the matrix are made primarily of metal or ceramic. The skeletal composite material can be made by filling a skeleton structure with powder, compacting the skeleton structure and powder to form a preform, and consolidating the preform to form the skeletal composite material.

25 Claims, 6 Drawing Sheets

COMPOSITE MATERIAL HAVING AN INTERNAL SKELETON STRUCTURE

CROSS-REFERENCE TO RELATED PATENT APPLICATIONS

This claims the benefit of U.S. Provisional Pat. App. No. 62/263,738 titled "Hybrid Body Comprising an Internal Skeletal Network," filed on 7 Dec. 2015, the entire contents of which are incorporated by reference into this document. In the event of a conflict, the subject matter explicitly recited or shown in this document controls over any subject matter incorporated by reference. The incorporated subject matter should not be used to limit or narrow the scope of the explicitly recited or depicted subject matter.

BACKGROUND

A metal matrix composite (MMC) is a composite material made of at least two constituent materials, one of which is metal. The other material(s) in an MMC can be another metal, ceramic material, organic material, or the like. Conventional MMCs include a metal matrix reinforced with one or more other materials in the form of particulates, whiskers, or fibers.

The reinforcement material is embedded into the metal matrix. The reinforcement material can be used to structurally reinforce the material or to change its physical, chemical, or mechanical properties such as wear resistance, friction coefficient, or thermal conductivity. The reinforcement material can be coated by such means as physical vapor deposition (PVD), chemical vapor deposition (CVD) or other suitable method to prevent undesirable chemical reactions with the metal matrix.

The reinforcement material can be characterized as being continuous or discontinuous depending on the aspect ratio of the material. For example, reinforcement materials having an aspect ratio greater than approximately 50:1 can be considered continuous while those having an aspect ratio less than or equal to approximately 50:1 can be considered discontinuous. Examples of continuous reinforcement materials include long fibers or whiskers and monofilament wires. Examples of discontinuous reinforcement materials include short fibers or whiskers and particles.

MMCs with continuous reinforcement are generally anisotropic meaning that their mechanical and/or physical properties vary depending on the direction of the material that is tested. This is usually due to the reinforcement material being embedded in the metal matrix in a certain direction. On other hand, MMCs with discontinuous reinforcement are generally isotropic meaning that their mechanical and/or physical properties are uniform in all directions and independent of the direction of the material that is tested. This is usually due to the reinforcement material being embedded homogenously in all directions.

Unfortunately, conventional MMCs and other composites suffer from a number of problems. One problem is that they are not particularly suited for applications where fracture mechanics are important. MMCs tend to fragment unpredictably in these situations. MMCs produce complex internal crack patters that are difficult to predict using standard fracture mechanics tests and analytical methods for metals, which assume self-similar crack extension—i.e., a crack will simply lengthen without changing shape.

Another problem is that the uses of conventional MMCs are limited by their structures and the materials used to make them. Applicant has discovered new applications for composite materials that include an internal skeleton structure.

SUMMARY OF SOME ASPECTS OF THE DISCLOSURE

Skeletal composite materials include an internal skeleton structure surrounded by a matrix material. A number of embodiments of skeletal composite materials are disclosed to illustrate their features, characteristics, and advantages. It should be understood that the features, characteristics, advantages, etc., of the different embodiments can be used alone or in various combinations and/or sub-combinations with one another.

The skeleton structure and the matrix are made of different materials having different properties. It should be appreciated that the skeleton structure and the matrix can be made of any suitable material including metal, ceramic, carbon, polymers, or combinations of these materials. Preferably, the skeleton structure and/or the matrix are made primarily of metal or ceramic.

In some embodiments, the skeletal composite material is made using a low temperature, high pressure process to prevent the skeleton structure and the matrix from reacting with each other. Reducing or eliminating inter-component reactions helps the skeleton structure and the matrix maintain their unique physical properties, which provide the skeletal composite material with many advantages.

In some embodiments, the skeletal composite material can be used as part of a controlled fragmentation device such as military munitions like hand grenades, bombs, and artillery shells. The skeleton structure can be made of a material that significantly more ductile than the matrix or significantly more brittle than the matrix. When the skeletal composite material explodes, it experiences ductile fracture or brittle fracture along the skeleton structure to form a controlled fragmentation of the matrix.

In some embodiments, the skeletal composite material can be used as a filter or catch basin. In these embodiments, the skeleton structure is made of a material that is resistant to corrosion and the matrix is made of a material that is susceptible to corrosion. The skeletal composite material is positioned in the desired and perhaps difficult to access locations—e.g., in the downhole of a well—and exposed to a corrosive agent (brine solution, acid, base, etc.). The corrosive agent removes the matrix leaving the skeleton structure in place to function as a filter or catch material.

In some embodiments, the skeletal composite material can be configured to disintegrate in a controlled and preferential manner. In these embodiments, the skeleton structure is made of a material that is more susceptible to corrosion than the matrix. The skeletal composite material is positioned in the desired location and exposed to a corrosive agent. The skeleton structure disintegrates rapidly producing corrosion pathways through the skeletal composite material that makes it corrode away at the desired rate.

It should be appreciated that the properties of the various materials referenced are those measured using test methods and standards that are widely used and accepted in the field of MMCs. These test methods and standards include the applicable methods and standards set forth by ASTM International and/or the International Organization for Standardization (ISO). It should also be appreciated that corrosion refers to the destruction or deterioration (slow or rapid) of a material by chemically and/or electrochemically reacting with another material.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIG. 6 also shows the skeletal composite material shown in FIG. 2 for comparison.

DETAILED DESCRIPTION

Various embodiments of a skeletal composite material are disclosed. In general, the skeletal composite material includes an internal skeleton structure (also referred to as a skeleton network, skeleton network structure, skeleton core structure, and skeleton core network) disposed in a matrix. The skeleton structure is made of a different material and has different physical properties than the matrix.

The different physical properties of the skeleton structure and the matrix provide the skeletal composite material with many advantages. For example, in some embodiments, the skeleton structure can be made of a material that fractures easier than the matrix. Skeletal composite materials built from these materials can be used as the casing for artillery shells, bombs, grenades, and the like. When the casing explodes, the skeletal composite material predictably fractures along the skeleton structure to produce a controlled fragmentation effect.

As another example, the skeleton structure and the matrix can be made of materials that have different corrosion rates. In some embodiments, the skeleton structure can be made of a corrosion resistant material and the matrix can be made of a corrosion susceptible material. When the skeletal composite material is exposed to a corrosive compound, the matrix is corroded away and the skeleton structure remains.

In some other embodiments, the skeleton structure can be made of a material that is more susceptible to corrosion than the matrix. When the skeletal composite material is exposed to a corrosive compound, the skeleton structure provides a selective corrosive path through the skeletal composite material, which allows the skeletal composite material to disintegrate at a controlled rate over a controlled period.

The skeletal composite material can be made using processes that prevents the skeleton structure and the matrix from reacting with each other. For example, the skeletal composite material can be made using a low temperature, high pressure solid-state consolidation (powder densification) process that prevents reactions between the skeleton structure and the matrix. Preventing reactions maintains the separate and distinct physical properties of the skeleton structure and the matrix that provide the skeletal composite material with certain advantages. It should be appreciated that the skeletal composite material can also be made using processes that facilitate reactions between the skeleton structure and the matrix.

The skeletal composite material can be made into a variety of shapes and have a variety of configurations. For example, in some embodiments, the skeleton structure can be coextensive with the skeletal composite material—i.e., extend throughout the entire skeletal composite material. In other embodiments, the skeleton structure can be positioned in only a portion of the skeletal composite material—e.g., the skeleton structure is only disposed in the center of the skeletal composite material and is surrounded by areas that are made of only the matrix.

It should be appreciated that the skeleton structure and the matrix can be made of a variety of materials and take on many physical forms. For example, the skeleton structure and/or the matrix can be made of metal, ceramic, carbon, polymer, or combinations of these. Accordingly, the skeleton structure and/or the matrix can be made of any combination of these materials disclosed in this document regardless of the context in which they are disclosed.

Skeleton Structure Composition and Properties

The skeleton structure can have a variety of compositions. In some embodiments, the skeleton structure is a metal skeleton structure that is entirely made of metal and/or metal alloys. Any suitable metal can be used to form the skeleton structure including alkaline earth metals, transition metals, and metals described in the periodic table under classes IIA, IIIB, IVB, VB, VIB, VIIB, VIII, IB, and IIB. Examples of metals that can be used to make the skeleton structure include aluminum, copper, nickel, tin, zinc, stainless steel, titanium, Inconel, and combinations of these metals.

In some embodiments, the skeleton structure is a non-metal skeleton structure such as a ceramic skeleton structure that is entirely made of ceramic or a carbon skeleton structure that is entirely made of carbon. Examples of ceramics that can be used to make the skeleton structure include oxides such as aluminum oxide, aluminum titanate, and zirconium oxide; borides; carbides such as silicon carbide, boron carbide and tungsten carbide; and nitrides such as silicon nitride, aluminum nitride, and boron nitride.

In some embodiments, the skeleton structure is a composite skeleton structure that is made of a combination of any of the materials described above. For example, the skeleton structure can be a metal matrix composite that is primarily made of metal but can also include other materials such as ceramic, carbon, polymer, and the like. As another example, the skeleton structure can be a ceramic matrix composite that is primarily made of ceramic but also includes one or more other materials such as metal, carbon, polymer, and the like.

The composite skeleton structure can also include fibers, whiskers, particles, and the like of the various materials. Fibers and whiskers can be included for applications where it is desirable to reinforce the skeleton structure. In some embodiments, the skeleton structure includes continuous reinforcement materials. In other embodiments, the skeleton structure includes discontinuous reinforcement materials. In other embodiments, the skeleton structure includes both continuous and discontinuous reinforcement materials.

The skeleton structure includes a substantial amount of void space that fills with the matrix material during manufacturing. In some embodiments, the skeleton structure includes at least 50 vol % void space, at least 70 vol % void space, at least 80 vol % void space, at least 85 vol % void space, at least 90 vol % void space, at least 93 vol % void space, or at least 95 vol % void space. In other embodiments, the skeleton structure includes 50-99 vol % void space, 80-98 vol % void space, or 90-97 vol % void space. In other embodiments, the skeleton structure includes no more than 99 vol % void space, no more than 98 vol % void space, no more than 97 vol % void space, or no more than 95 vol % void space.

Another way to quantify the amount material in the skeleton structure is using the relative density, which is the density of the skeleton structure divided by the density of a corresponding solid piece of the same material. In other words, it is the mass of the material in the skeleton structure compared to what it would be if it were a solid block of the same material.

The skeleton structure can have any suitable relative density depending on the application. In some embodiments, the skeleton structure has a relative density of at least 1%, at least 2%, at least 3%, or at least 4%. In other embodiments, the skeleton structure has a relative density of 1-30%, 2-15%, or 3-10%. In other embodiments, the skeleton structure has a relative density of no more than 30%, no more than 15%, or no more than 10%.

The skeleton structure can be a preformed stand-alone structure that is included in the skeletal composite material. In some embodiments, the skeleton structure is a preformed mesh (alternatively referred to as a preformed mesh, foam, or foam mesh) having any of the compositions disclosed above. For example, the skeleton structure can be a metal mesh, ceramic mesh, carbon porous mesh, or a complex composite mesh of various materials.

In some embodiments, the mesh is a reticulated porous mesh or reticulated porous foam. These are notable because the matrix of cells and ligaments is completely repeatable, regular, and uniform throughout the entirety of the material. Examples of reticulated mesh include any of the DUOCEL mesh products available from ERG Aerospace Corporation, Oakland, Calif. 94608.

In general, reticulated mesh is a porous structure or open-celled mesh consisting of an interconnected network of solid struts. Like soap suds or beer foam, the original bubbles that formed the mesh are a three-dimensional, perfectly packed array of similar sized bubbles where each bubble has the maximum volume for the minimal surface area and surface energy.

Given these common physical constraints, each bubble in the array is typically a 14-faceted polyhedral or solid shape called a tetrakaidecahedron. Once the mesh is solidified, the thin membrane in each of the 14 facets or windows is removed by a reticulation process, creating an open cell and leaving only the thick outer perimeters of the window frames behind as a series of interconnected struts. The resulting bubble structure resembles a linked geodesic dome or buckyball structure where each link or strut is shared between three adjacent bubbles, thus creating the characteristic triangular cross-section.

In some embodiments, the open-celled structure is identical in all three directions and can therefore be considered an isotropic mesh. Just as all the structural ligaments or struts are interconnected, the open cell porosity is also interconnected, enabling fluids to pass freely into and out of the mesh structure.

In some embodiments, the reticulated mesh can be categorized as a primary mesh or a secondary mesh. A primary mesh is one where the base material is simply resolved to a liquid state, foamed directly, and then reticulated. The resulting mesh strut or ligament then includes a solid beam of roughly triangular section that is made of the solid, homogeneous base material chosen. While there is porosity in the bubble structure due to the foaming process, there are no porosities or discontinuities within the individual ligaments.

A secondary mesh is one made by post-processing a primary mesh to upgrade it for a specific function that cannot be technically or economically provided by a primary mesh. An example of a secondary mesh might be an aluminum primary mesh that has been uniformly coated with another metal or ceramic for a specific application.

One way to characterize the open cell mesh is by the number of pores per inch (PPI). The opening through each open window in the network structure is referred to as a pore. The pores are often polygonal and have two or three different characteristic sizes and shapes, but for material designation purposes, they are simplified to an average size and circular shape. The number of these pores that would subtend one inch then designates the porous mesh pore size.

The pore size defines how finely the raw material of a skeleton structure is divided. The network structural shape is present regardless of the PPI, but a 5 PPI structure will visually appear more open and course than a 40 or 100 PPI structure. Accordingly, the mesh pore size directly affects nominal ligament length and cross section size, and pore diameter.

It should be appreciated that the mesh can have any suitable PPI. In some embodiments, the mesh has at least 2 PPI, at least 3 PPI, at least 5 PPI, at least 10 PPI, at least 20 PPI, or at least 25 PPI. In other embodiments, the mesh has 2-100 PPI, 3-50 PPI, or 10-25 PPI. In other embodiments, the mesh has no more than 100 PPI, no more than 80 PPI, no more than 60 PPI, or no more than 50 PPI.

Matrix Composition and Properties

The matrix fills in the void spaces in the skeleton structure. The matrix can have a variety of compositions including any of those mentioned above. In some embodiments, the matrix is a metal matrix that is entirely made of metal and/or metal alloys. Examples of metals that can be used to form the matrix include refractory metals such as niobium, molybdenum, tantalum, tungsten, rhenium and their alloys such as tungsten-nickel-iron, molybdenum-tungsten, molybdenum-rhenium, aluminum, magnesium, iron, titanium, and combinations of these metals and various metal matrix composites comprised of metal or ceramic second phase reinforcements. In some embodiments, the matrix includes metals of essentially different electronegative potentials.

In some embodiments, the matrix is a non-metal matrix such as a ceramic matrix that is entirely made of ceramic or a carbon matrix that is entirely made of carbon. Examples of ceramics that can be used to form the matrix include oxides such as aluminum oxide, aluminum titanate, and zirconium oxide; borides; carbides such as silicon carbide, boron carbide and tungsten carbide; and nitrides such as silicon nitride, aluminum nitride, and boron nitride.

In some embodiments, the matrix is a composite matrix that is made of a combination of any of the materials described above. For example, the matrix can be a metal matrix composite such as aluminum silicon carbide, magnesium boron carbide and others that are primarily made of metal but also includes other materials such as ceramic, carbon, polymer, and the like. As another example, the matrix can be a ceramic matrix composite that is primarily made of ceramic but also includes one or more other materials such as metal, carbon, polymer, and the like.

The composite matrix can also include fibers, whiskers, particles, and the like of the various materials. Fibers and whiskers can be used for applications where it is desirable to reinforce the matrix. In some embodiments, the matrix includes continuous reinforcement materials. In other embodiments, the matrix includes discontinuous reinforcement materials. In other embodiments, the matrix includes both continuous and discontinuous reinforcement materials.

The use of the skeletal composite material for fragmentation, filtration, and selective corrosion is described in greater detail below. It should be appreciated that although these applications are highlighted, the skeletal composite material can be used in numerous other applications. For example, the skeletal composite material can be used in other applications such as those requiring increased strength, crack resistance, and toughness.

Fragmentation

As mentioned briefly above, one application of the skeletal composite material is for controlled fragmentation. The skeletal composite material can be used to make the casing for a variety of military munitions or ordnance such as artillery shells, bombs, grenades, and the like. The skeletal composite material can be configured to selectively fracture along the skeleton structure to allow small fragments to break away in a controlled manner.

There are numerous ways the skeletal composite material can be configured so that it selectively fractures along the skeleton structure when it explodes. For example, in some embodiments, the skeleton structure can be made of a material that has high plasticity—i.e., is highly ductile and/or malleable—compared to the matrix. In other embodiments, the skeleton structure can be made of a material that is relatively brittle compared to the matrix. In both cases, the skeleton structure is more prone to fracture than the matrix when the skeletal composite material explodes, which causes it to break apart along the boundaries of the skeleton structure.

Failure of a relatively ductile skeleton structure is caused by ductile fracture, and failure of a relatively brittle skeleton structure is caused by brittle fracture. The difference between the two is that materials that experience ductile fracture undergo extensive plastic deformation before the material fractures while materials that experience brittle fracture do not.

Materials that undergo ductile fracture typically go through the following stages: (a) initial necking, (b) small cavity formation (microvoids), (c) void growth (ellipsoid) by coalescence into a crack, (d) fast crack propagation around neck (shear strain at 45°), (e) final shear fracture (cup and cone). In contrast, there is no appreciable deformation with brittle fracture and crack propagation is very fast. In many brittle materials, crack propagation (by bond breaking) is along specific crystallographic planes (cleavage planes). This type of fracture is transgranular (through grains) producing grainy texture (or faceted texture) when cleavage direction changes from grain to grain. In some materials, fracture is intergranular.

For those embodiments where the skeleton structure is relatively ductile compared to the matrix, the skeleton structure is typically made primarily of metal and metal alloys. For example, in some embodiments, the skeleton structure includes at least 50 wt % metal, at least 60 wt % metal, at least 70 wt % metal, at least 80 wt % metal, at least 90 wt % metal, at least 95 wt % metal, 99 wt % metal, or entirely metal. In other embodiments, the skeleton structure includes 50-100 wt % metal, 60-99 wt % metal, or 70-95 wt % metal. The non-metal material in the skeleton structure can be any combination of the non-metal materials disclosed in this document.

In those same embodiments, the difference in ductility between the skeleton structure and the matrix can be quantified using the hardness (Rockwell A, B, C, Vickers, Brinell), tensile strength, yield strength, and the like. For example, in some embodiments, the hardness, tensile strength, and/or yield strength of the matrix is at least 15% higher than the skeleton structure, at least 30% higher than the skeleton structure, at least 50% higher than the skeleton structure, at least 75% higher than the skeleton structure, at least 100% higher than the skeleton structure, at least 250% higher than the skeleton structure, at least 500% higher than the skeleton structure, at least 750% higher than the skeleton structure, or at least 1000% higher than the skeleton structure.

It should be appreciated the skeleton structure can be made of any suitable ductile material. For example, in some embodiments, the skeleton structure includes ductile metals such as aluminum, copper, tin, magnesium, iron, titanium. The amount of the ductile metals in the skeleton structure can be the same as any of the percentages of total metal in the skeleton structure given above.

For those embodiments where the skeleton structure is relatively brittle compared to the matrix, the skeleton structure typically includes a substantial amount of ceramic. For example, in some embodiments, the skeleton structure includes at least 20 wt % ceramic, at least 40 wt % ceramic, at least 50 wt % ceramic, at least 60 wt % ceramic, at least 70 wt % ceramic, at least 80 wt % ceramic, at least 90 wt % ceramic, at least 95 wt % ceramic, 99 wt % ceramic, or entirely ceramic. In other embodiments, the skeleton structure includes 20-100 wt % ceramic, 40-90 wt % ceramic, or 30-70 wt % ceramic. The non-ceramic material in the skeleton structure can be any combination of metals or other material disclosed in this document.

In those same embodiments, the difference in brittleness between the skeleton structure and the matrix can be quantified using the fracture toughness, percent elongation, and the like. For example, in some embodiments, the fracture toughness and percent elongation of the matrix is at least 15% higher than the skeleton structure, at least 30% higher than the skeleton structure, at least 50% higher than the skeleton structure, at least 75% higher than the skeleton structure, at least 100% higher than the skeleton structure, at least 250% higher than the skeleton structure, at least 500% higher than the skeleton structure, at least 750% higher than the skeleton structure, or at least 1000% higher than the skeleton structure.

It should be appreciated the skeleton structure can be made of any suitable brittle material. For example, in some embodiments, the skeleton structure includes ceramics such as such as silicon carbide, aluminum oxide, titanium aluminde, inter-metallics, and others. The amount of ceramic in the skeleton structure can be the same as any of the percentages of total ceramic in the skeleton structure given above.

The matrix can be made of any suitable material and have any suitable properties regardless whether it is used with a ductile or a brittle skeleton structure. In general, it is desirable for the matrix to be strong, tough, and hard when using it for fragmentation regardless whether the skeleton structure is ductile or brittle. Also, the matrix is typically not overly ductile or brittle; it is between the two.

In some embodiments, the matrix can be made primarily of metal and metal alloys. For example, the matrix can include any of the percentages of metal given above for the skeleton structure. In other embodiments, the matrix can include a substantial amount of ceramic including any of the percentages given above for the skeleton structure. In some embodiments, however, the amount of ceramic is reduced to prevent the matrix from becoming too brittle.

For example, in some embodiments, the matrix includes no more than 80 wt % ceramic, no more than 30 wt % ceramic, no more than 20 wt % ceramic, no more than 15 wt % ceramic, no more than 10 wt % ceramic, no more than 5 wt % ceramic, no more than 3 wt % ceramic, or substantially no ceramic. In other embodiments, the matrix includes 0-50 wt % ceramic, 1-20 wt % ceramic, or 2-10 wt % ceramic.

One property that can be used to establish the suitability of a material for use as the matrix is its ductile-to-brittle transition temperature (DBTT). The DBTT is the temperature at which the fracture energy passes below a predetermined value—e.g., for steels typically 40 J for a standard Charpy impact test. In other words, the DBTT is the temperature at which the material becomes relatively brittle.

In general, it is desirable for the DBTT of the matrix to be low enough to prevent the matrix from becoming brittle and easy to fracture at the design temperature. For military munitions, the design temperature can be relatively low so the munition can be used in low temperature environments such as the bomb bay of an airplane, arctic locales, and the like. In some embodiments, the DBTT of the matrix is no more than 25 C, no more than 15 C, no more than 0 C, no more than −10 C, or no more than −20 C.

The DBTT is more prevalent in ductile materials that have body-centered cubic (bcc) crystals. Other materials that do not have bcc crystals tend to remain ductile at low temperatures. For this reason, in some embodiments, the matrix does not include any bcc crystals or includes a small enough amount of bcc crystals to prevent the matrix from having DBTT that is above the design temperature for a given application.

Examples of materials that can be used to make the matrix includes refractory metals (niobium, molybdenum, tantalum, tungsten, and rhenium) and/or their alloys. For example, in some embodiments, the matrix includes at least 50 wt % refractory metals/alloys, at least 60 wt % refractory metals/alloys, at least 70 wt % refractory metals/alloys, at least 80 wt % refractory metals/alloys, at least 90 wt % refractory metals/alloys, at least 95 wt % refractory metals/alloys, 99 wt % refractory metals/alloys, or entirely refractory metals/alloys. In other embodiments, the matrix includes 50-100 wt % refractory metals/alloys, 60-99 wt % refractory metals/alloys, or 70-95 wt % refractory metals/alloys.

The skeletal composite material can be made in a variety of shapes and sizes for use as a fragmentation device. For example, in some embodiments, the skeletal composite material includes a cavity configured to receive and hold explosive material. The cavity can be closed using a plug, fuse, or other suitable closure device. In other embodiments, the skeletal composite material can have shapes such as flat, semi-spherical, cylindrical, and the like.

A fragmentation device, explosive device, military munition, or the like can be made and used by following at least one step in the following method. First, the skeletal composite material is made with any of the compositions or physical shapes described above. The skeletal composite material forms the casing of the fragmentation device. Second, the casing is loaded with one or more explosive charges and/or armed by attaching a fuse, primer or the like to the device. Third, the fragmentation device is fired, dropped, launched, etc. and the explosive charge is detonated when it reaches the target. The internal domains of matrix material are blown outward in a controlled manner that causes significant damage to the target.

Filtration or Catch Basin

The skeletal composite material can be used as a filtration device or catch basin. In general, this is done by positioning the skeletal composite material in a desired location and selectively removing the matrix to leave the skeleton structure, which then functions as a filter or catch basin. In this application, the principal distinguishing feature between the skeleton structure and the matrix is that the former is largely or entirely resistant to the material/process used to remove the matrix.

It should be appreciated that the matrix can be removed using any one of many processes and/or materials. In some embodiments, the matrix is removed using a material that is highly corrosive to the matrix but not corrosive to the skeleton structure. Examples of such corrosive materials include salt (NaCl), especially in the form of a brine solution, acids (weak acids such as acetic acid, formic acid, hydrofluoric acid, and the like and strong acids such as hydrochloric acid, sulfuric acid, nitric acid, and the like), bases (weak bases such as ammonia, calcium hydroxide, and the like and strong bases such as sodium hydroxide, potassium hydroxide, and the like), strong oxidizers such as hydrogen peroxide, and the like.

Any suitable materials can be used to form the skeleton structure and the matrix provided that there is a substantial difference in their corrosion rates with the matrix being much more susceptible to corrosion than the skeleton structure. For example, in some embodiments, the skeleton structure can be largely or entirely resistant to the corrosive material. In other embodiments, the corrosion rate of the matrix is at least 50% higher than that of the skeleton structure, at least 75% higher than that of the skeleton structure, at least 100% higher than that of the skeleton structure, at least 250% higher than that of the skeleton structure, at least 500% higher than that of the skeleton structure, at least 1000% higher than that of the skeleton structure, or at least 2000% higher than that of the skeleton structure.

In some embodiments, the skeleton structure and/or the matrix can include the same percentages and/or types of metals, ceramic, and/or other materials disclosed in any of the other embodiments in this document. For example, the skeleton structure can have the same void percent disclosed above or the same percentage of metal as disclosed in the fragmentation application. As another example, the matrix can include any of the same materials in any of the same percentages disclosed in the fragmentation application.

Examples of materials that can be used to make the skeleton structure and the matrix include aluminum skeleton/magnesium-aluminum matrix with acidid, saline, water, or produced well waters solvents; aluminum skeleton/magnesium-aluminum-iron matrix with acidic, saline, water or produced well waters solvents; aluminum skeleton/magnesium-aluminum-tungsten matrix with acidic, saline, water, or produced well waters solvents.

The skeletal composite material can be used as a filtration device or catch basin using at least one step in the following method. First, the skeletal composite material is made to fit within a hole or other opening, for example, in a downhole or drill hole of an oil or gas well. Second, the skeletal composite material is positioned in the hole. Third, the skeletal composite material is exposed to a corrosive material that selectively corrodes away the matrix leaving the skeleton structure. Fourth, use the skeleton structure to filter fluid that passes through it or use it to catch things that would otherwise fall through the hole—e.g., things that may fall into a downhole such as tools, pieces of drill equipment, and the like.

Selective Corrosion Pathway

The skeletal composite material can be configured to disintegrate at a controlled rate over a controlled period of time. This may be useful in a variety of situations including such situations when the skeletal composite material is only needed temporarily or when it needs to be removed for one reason or another.

This can be accomplished by making the skeleton structure and the matrix out of materials that have different corrosion rates. In general, the skeleton structure has a higher corrosion rate than the matrix so that when the skeletal composite material is exposed to a corrosive agent, the skeleton structure corrodes away quickly to provide a selective corrosive path through the article. The materials used to make the skeleton structure and the matrix as well as the corrosive material can be selected to control the rate of disintegration of the skeletal composite material.

It should be appreciated that the corrosion rate of the skeleton structure relative to the matrix can be any suitable amount so long as the skeleton structure corrodes at a faster rate. For example, in some embodiments, the corrosion rate of the skeleton structure is at least 50% higher than that of the matrix, at least 75% higher than that of the matrix, at least 100% higher than that of the matrix, at least 250% higher than that of the matrix, at least 500% higher than that of the matrix, at least 1000% higher than that of the matrix, or at least 2000% higher than that of the matrix. In some embodiments, the corrosion rate of the skeleton structure can be 1-200 mg/cm$^2$·hr and the corrosion rate of the matrix can be 220-3,000 mg/cm$^2$·hr.

Examples of materials that can be used to make the skeleton structure and the matrix include: (1) skeleton is one or a combination of elemental magnesium, magnesium-aluminum-tungsten (W) and magnesium-aluminum-iron (Fe), matrix is magnesium-aluminum, and solvent is acidic, saline, water, or produced well waters and (2) skeleton is aluminum, matrix is magnesium-aluminum-tungsten (W), ad solvent is acidic, saline, water, or produced well waters.

Any suitable corrosive material can be used to disintegrate the skeletal composite material. For example, in some embodiments, any of the corrosive materials described above in connection with the filtration application can be used. In other embodiments, any solution having a pH from 0 (highly acidic) to 14 (highly alkaline) can be used.

Manufacturing Process

The skeletal composite material can be made using any suitable process. The following is a description of various processes that can be used to make the skeletal composite material. It should be appreciated that various steps in the process below can be combined, omitted, and/or reordered depending on the circumstances.

Material Preparation

The first step is to position the skeleton structure in a container. The skeleton structure can be any of those described above—e.g., a metal or ceramic mesh. The second step is to add the selected powder matrix to the container to fill the open volume in the skeleton structure. The powder can include any of the materials described above. Also, the powder can be encapsulated in or coated with various compounds that enhance inter-particle bonding, structural integrity, stiffness, reduce weight, and provide other application specific properties as desired. The coating layer can be one layer or multiple layers of the same or varying materials and in varying sequences to produce application specific properties.

It should be appreciated that the powder can have a variety of physical forms. For example, in some embodiments, the powder includes solid particulates. In other embodiments, the powder includes hollow spheres or microballoons. In other embodiments, the powder includes a mixture of these materials.

The third step is to seal and evacuate the container. In some embodiments, the container is made air tight during this step to prevent any outside material including gases from entering the container. It should be appreciated that in alternate embodiments, the container is not sealed and/or made air tight. The container can be left open.

Compaction to Form Near Net Shape Component

The fourth step is to compact the container with the skeleton structure and powder in it to form a near net shape component or preform at approximately 50-80% of theoretical density. This is typically done in a die by applying high pressure. The compaction process can be a hot or cold compaction process. In some embodiments, the temperature of the compaction process is kept relatively low to prevent the skeleton structure from reacting with the powder.

The density of the compacted material is proportional to the amount of pressure applied. The outer surface of the container experiences compressive force that is sufficient to bond the powder particles together to form a semi-solid body. Any suitable amount of pressure can be used depending on the application. In some embodiments, the skeleton structure and powder are compacted at pressures between 0.5-700 MPa or, preferably, 100-650 MPa.

Consolidation of Near Net Shape Component to Form the Skeletal Composite Material The fifth step is to consolidate the near net shape component preferentially via a solid state densification process to form the densified skeletal composite material. In some embodiments, the temperature of the consolidation process is kept relatively low to prevent reactions between the skeleton structure and the powder and/or prevent the skeleton structure and/or the powder from melting—e.g., a low temperature, high pressure solid-state consolidation (powder densification) process.

In some embodiments, the consolidation process involves the application of varying pressures to control the formation of the microstructure and resultant mechanical properties. By utilizing solid-state processes, there are no inter-facial reactions between the skeleton structure and the powder and no detrimental effects due to oxidation of a molten matrix.

In some embodiments, dual mode dynamic forging (DMDF) is used to consolidate the near net shape component. DMDF involves the rapid application (within seconds) of a rate-controlled high uni-axial pressure (1.24 GPa/180 Ksi) on a heated forging preform (300° C.-1500° C.) via a granular pressure transmitting media (PTM). It is an easily automated four step, manufacturing technology for the production of low, medium, and high volume components. Solid-state powder densification of a near net shape, powder metallurgy forging preform or hermetically sealed "canned powders", occurs in a matter of seconds within a dynamic pressure field. Unlike hot isostatic pressing (HIP) which simply applies a uniform low-pressure gas to consolidate a powder, the DMDF process simultaneously applies a large axial pressure coupled with a smaller radial pressure, (i.e., non-isostatic), thus enabling both powder consolidation and in-situ hot working of the material.

In DMDF, powder deformation (shear) is accomplished via the naturally induced pressure differential created in the dynamic pressure field. Thus, the 60-80% dense forging preform experiences both axial compression, and radial expansion which creates a dimensionally predictable and highly beneficial, in-situ shear stress. In some embodiments, the powder is hot consolidated in a simple "pot die" to form fully dense, near-net-shape components, thus eliminating the normal die wear associated with conventional forging. In other embodiments, the powder is not hot consolidated to prevent reactions between the skeleton structure and the matrix.

In some embodiments, the container is heated to the lowest temperature that will permit complete densification of the skeleton structure and the matrix. This temperature can be determined through a comprehensive parametric study of temperature, dwell-time and strain-rate, for each material. The skeleton structure and powder can be heated by any number of conventional methods such as radiation and induction.

The DMDF process can include the following steps. Initially, the PTM is heated in any number of ways. For example, in some embodiments, the PTM is heated via a fluidized bed technique to a temperature that has been determined from the parametric study to yield a fully dense material. Several types of pressure transmitting media can be used depending upon the material being consolidated.

In some embodiments, any of the processes disclosed in U.S. Pat. No. 8,535,604 can be used to consolidate the near net shape component. U.S. Pat. No. 8,535,604 is incorporated by reference into this document in its entirety.

The next step is to partially fill the pot die with the heated PTM and place the preform or canned skeleton structure and matrix in it. Additional heated PTM is poured into the pot die to cover the heated powder preform.

A hydraulic press ram pressurizes the PTM and consolidates the part to full density. This is done by lowering the forging ram into the pot die until it comes into contact with the heated PTM. As the pressure increases the forging ram first pressurizes the heated PTM which in turn pressurizes and virtually instantaneously consolidates the near-net-shape powder preform.

The PTM can be designed so that after the consolidation and deformation step have been completed, a simple screening technique can be used to easily separates the PTM and skeletal composite material. The now fully dense, skeletal composite material can be sandblasted or directly placed into a heat treat quench tank. The separated PTM can be recycled through the fluidized bed furnace.

In some embodiments, the near net shape component is removed from the container and processed at high temperatures between 150° C. to 1500° C. and high pressures between 200 MPa to 900 MPa to fully densify the near net shape component. One method for the hot consolidation step is disclosed in U.S. Pat. No. 8,535,604.

Secondary Processing of the Skeletal Composite Material

The sixth step is for the skeletal composite material to undergo additional secondary processing. For example, the skeletal composite material can be machined, extruded, forged, stamped, or the like. It should be appreciated that this step is optional, just like many of the other processing steps.

EXAMPLES

The following examples are provided to further illustrate the disclosed subject matter. They should not be used to constrict or limit the scope of the claims in any way.

Example 1

5 PPI Skeleton Structure

Figure 1:
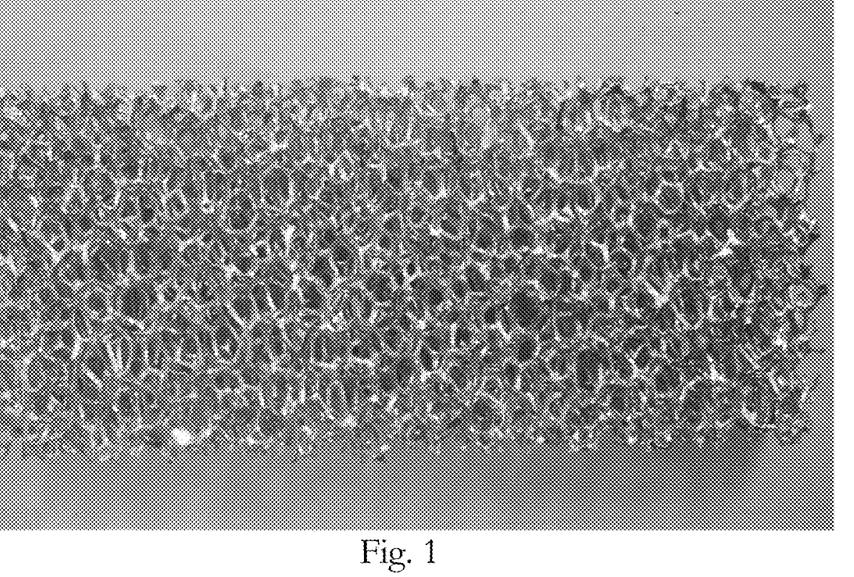
FIG. 1 is a picture of 5 PPI (pores per inch) aluminum mesh used as one embodiment of the skeleton structure.

A skeletal composite material was prepared by placing the 5 pore per inch (PPI) aluminum mesh shown in FIG. 1 in an elastomeric container, which is held within a rigid tube form for support during powder filling. Powder material was added to the elastomeric container to fill the open volume of the mesh. The composition of the powder material was a magnesium-aluminum-tungsten matrix. The container was sealed and evacuated to prevent intrusion of any tramp external matter including oxygen.

The sealed container was compacted in a conventional powder metallurgy cold isostatic press to approximately 80% theoretical density under 207 MPa (30 ksi) pressure to form a near net shape component.

Figure 2:
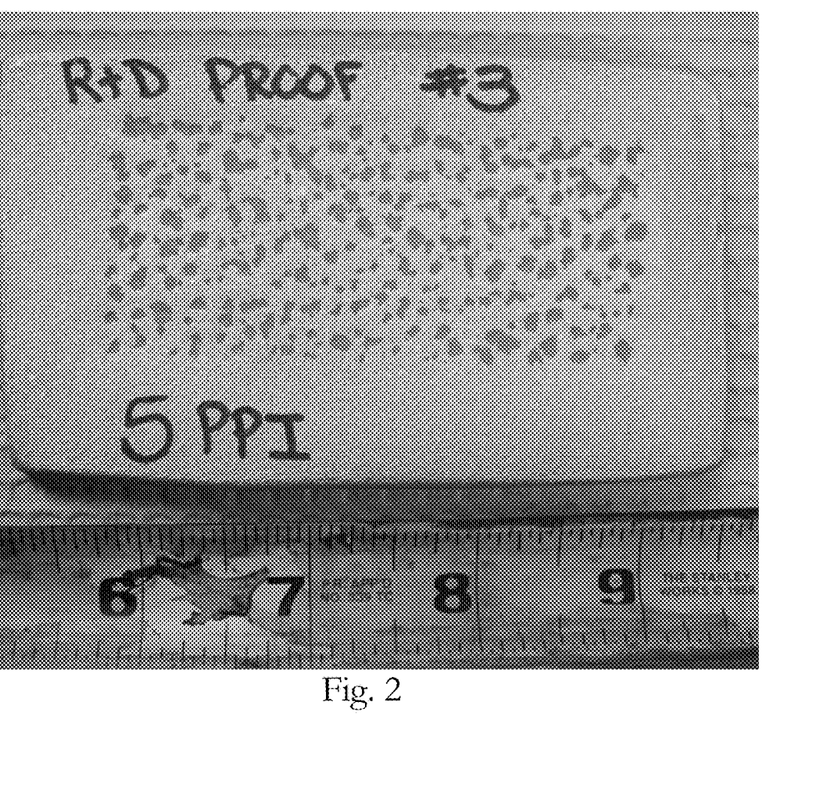
FIG. 2 is a picture of one embodiment of a consolidated skeletal composite material produced using the mesh in FIG. 1.

The near net shape component was consolidated by dual mode dynamic forging which is a solid-state densification forging process in a pressure range between 275-415 MPa (40-60 ksi) to form the skeletal composite material shown in FIG. 2. The skeleton structure formed by the mesh is visible on the surface of the skeletal composite material in FIG. 2 and is clearly distinct from the powder metal matrix.

Figure 3:
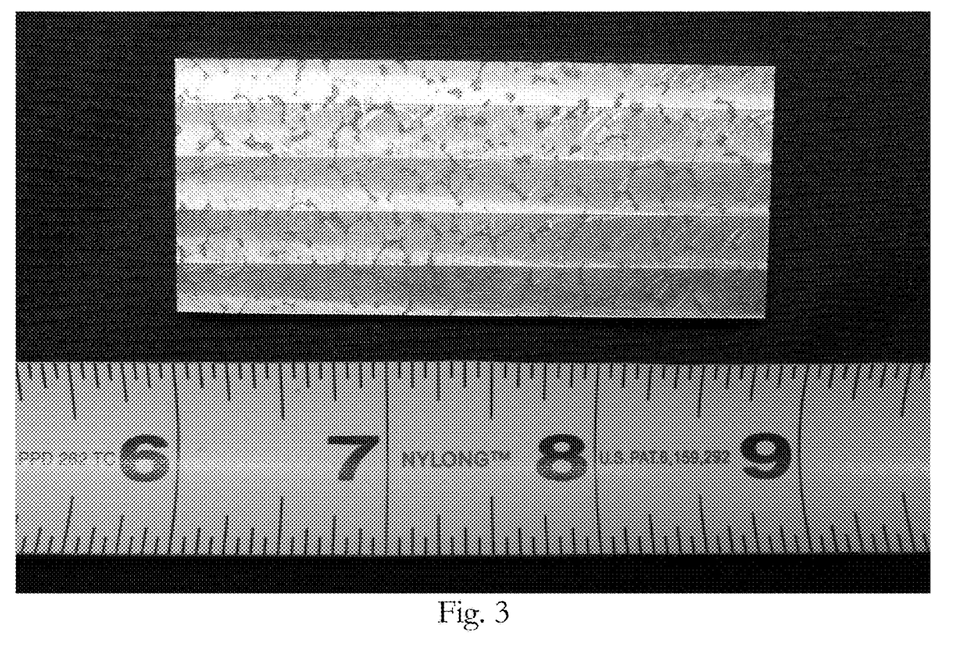
FIG. 3 is a picture of a surface of the skeletal composite material in FIG. 2 after it has been consolidated and machined clearly showing the intact skeletal structure and matrix material.

The skeletal composite material in FIG. 2 was machined. FIG. 3 is a picture of the machined surface with the skeleton structure clearly visible. Notably, the skeleton structure takes on a cellular appearance in FIG. 3 where domains of the metal matrix are surrounded or nearly surrounded by the skeleton structure.

Example 2

5 PPI Skeleton Structure

Figure 4:
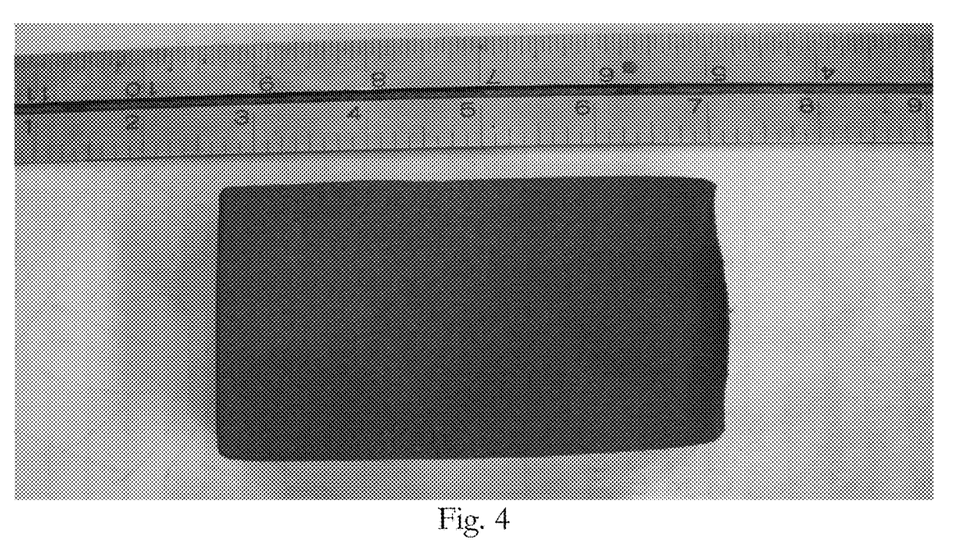
FIGS. 4-5 are pictures of another embodiment of an initial or starting skeletal composite material of 80% theoretical density before being consolidated to a density of 85-100% theoretical density made using the mesh in FIG. 1 and a different matrix than the one shown in FIG. 2.
Figure 5:
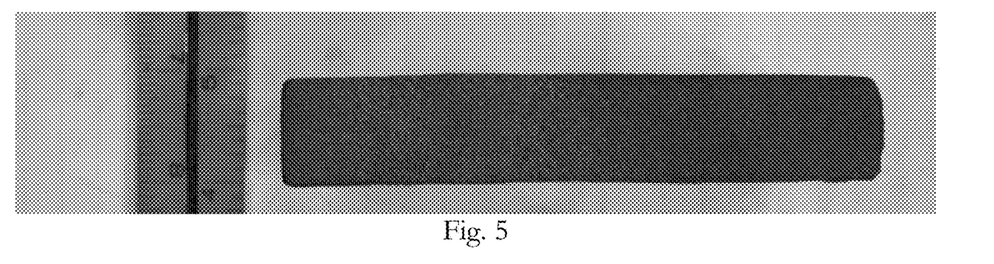

The skeletal composite material shown in FIGS. 4-5 was prepared using the same 5 PPI aluminum porous mesh, matrix, and procedure as in Example 1.

Example 3

40 PPI Skeleton Structure

Figure 6:
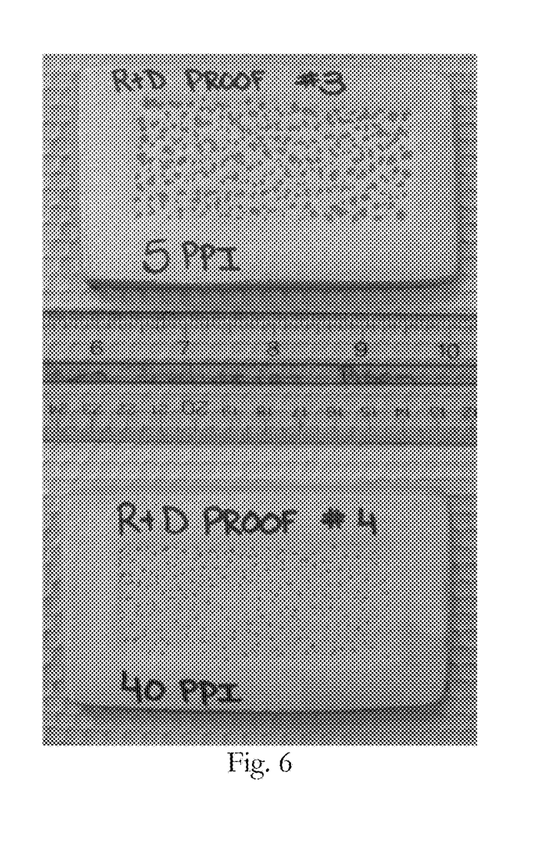
FIGS. 6-7 are pictures of another embodiment of the consolidated skeletal composite material produced using 40 PPI aluminum mesh.
Figure 7:
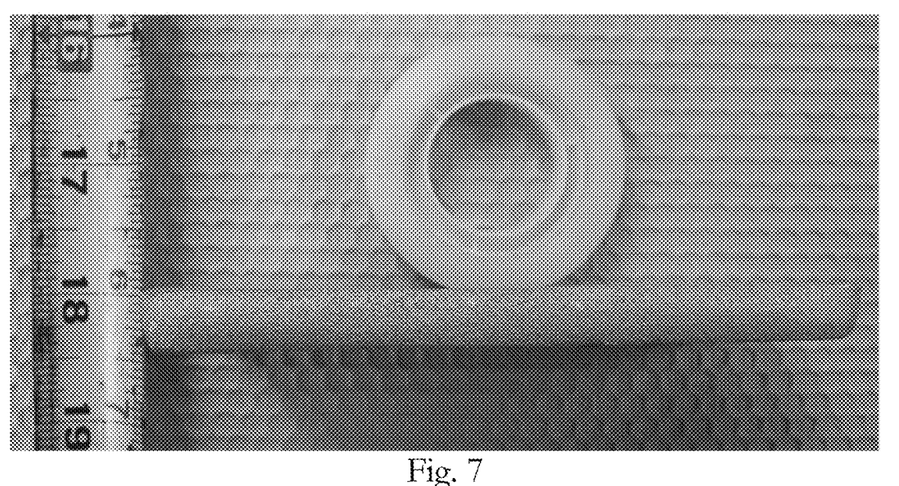
Figure 9:
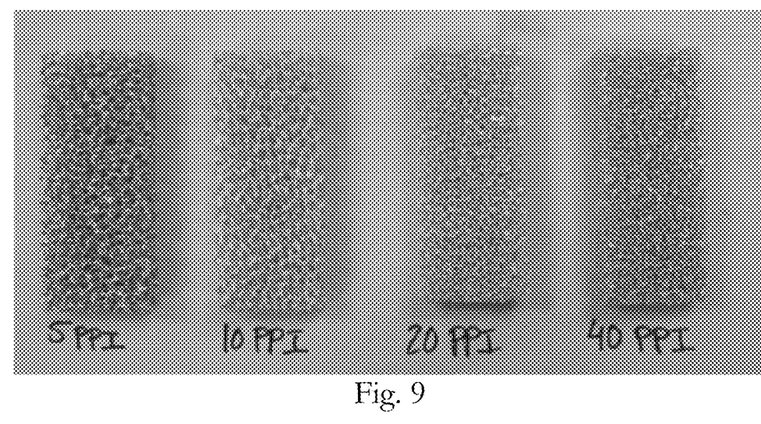
FIG. 9 is a picture of various aluminum skeletal meshes having 5 PPI, 10 PPI, 20 PPI, and 40 PPI.

A skeletal composite material was prepared using 40 PPI aluminum porous mesh shown in FIG. 9 and the same procedure and powder material in Example 1. FIG. 6 is a picture showing the skeletal composite material in Example 1 (top sample in the picture) and the skeletal composite material prepared in this example (bottom sample in the picture). As shown in FIG. 6, the finer aluminum mesh used in this example produced smaller metal matrix domains surrounded or nearly surrounded by the cells of the skeleton structure. FIG. 7 shows a side view of the skeletal composite material in FIG. 6.

Example 4

40 PPI Skeleton Structure

Figure 8:
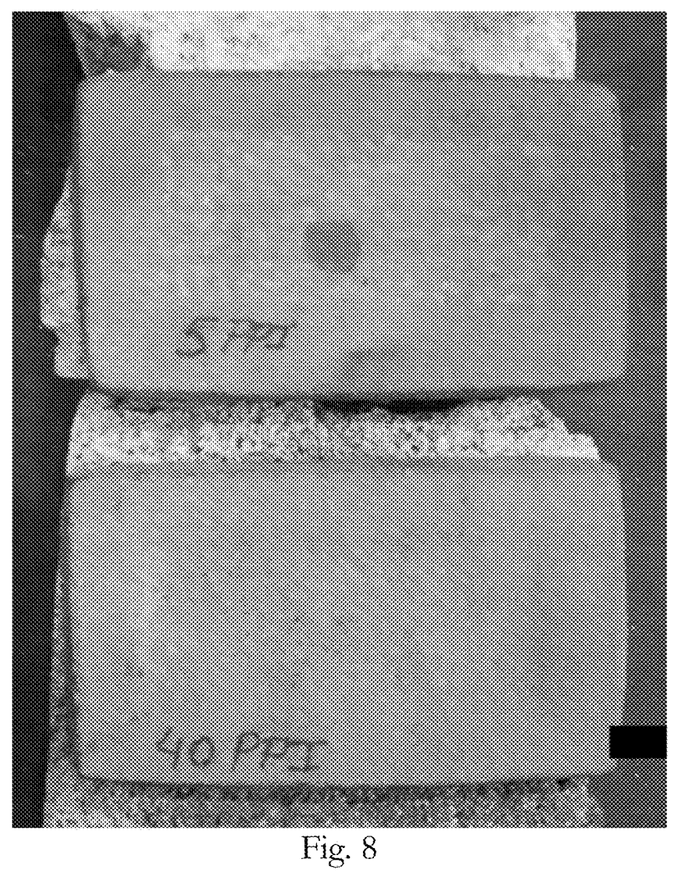
FIG. 8 is a picture of another embodiment of a consolidated skeletal composite material produced using 40 PPI aluminum mesh and a different matrix than the one shown in FIGS. 6-7.

The skeletal composite material shown in FIG. 8 was prepared using the same 40 PPI aluminum porous mesh shown in FIG. 9 and the same procedure described in Example 3. However, in this example, the composition of the powder material was the same as that in Example 2. FIG. 8 is a picture showing the skeletal composite material in Example 2 (top sample in the picture) and the composite material prepared in this example (bottom sample in the picture). As shown in FIG. 8, the finer aluminum porous mesh used in this example produced smaller metal matrix domains surrounded or nearly surrounded by the cells of the skeleton structure.

Example 5

5, 10, 20, 40 PPI Skeleton Structure

Figure 10:
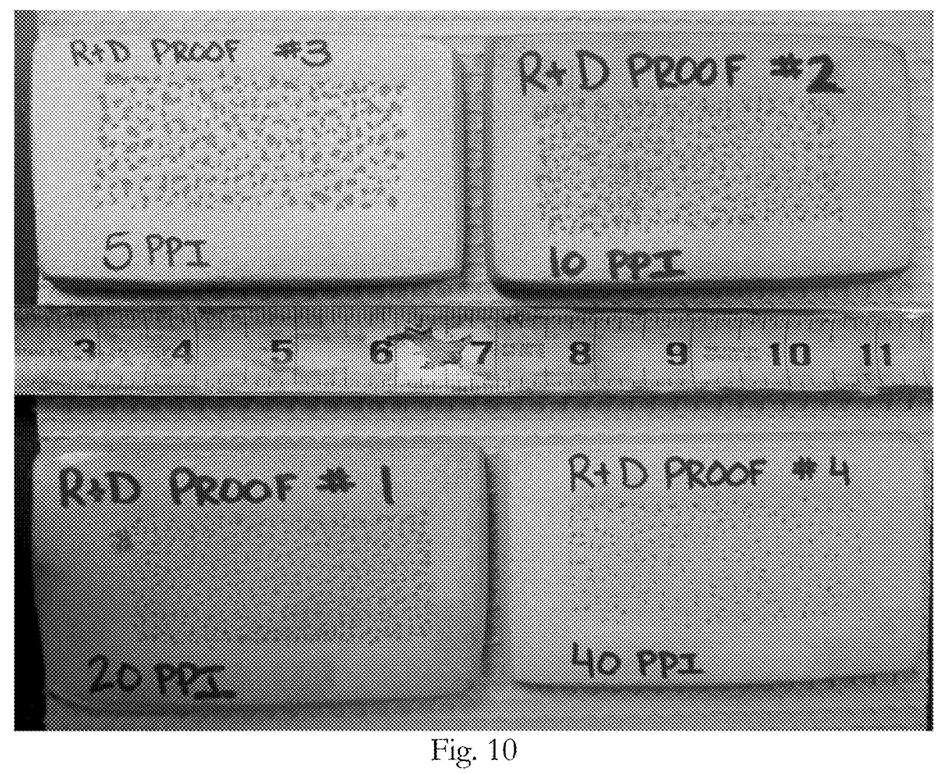
FIG. 10 is a picture showing two additional embodiments of the consolidated skeletal composite material made using aluminum mesh having 10 PPI and 20 PPI. The skeletal composite materials shown in FIGS. 2 and 6-7 are shown for comparison.

Skeletal composite materials were prepared using 10 PPI and 20 PPI aluminum mesh shown in FIG. 9 and same procedure and powder material in Example 1. FIG. 10 is a picture showing the skeletal composite materials in Example 1 and 3 (5 PPI and 40 PPI samples) and the skeletal composite material prepared in this example (10 PPI and 20 PPI samples). As shown in FIG. 10, the finer grades of aluminum porous mesh produced smaller metal matrix domains surrounded or nearly surrounded by the cells of the skeleton structure.

Example 6

Skeletal Composite Material Used as Filtration or Catch Basin

A skeletal composite material was prepared using the general process described in Example 1. The skeleton structure was made of aluminum and the matrix was made of magnesium-aluminum-tungsten (W) composite. The skeletal composite material is shown in the top image of the picture in FIG. 11.

Figure 11:
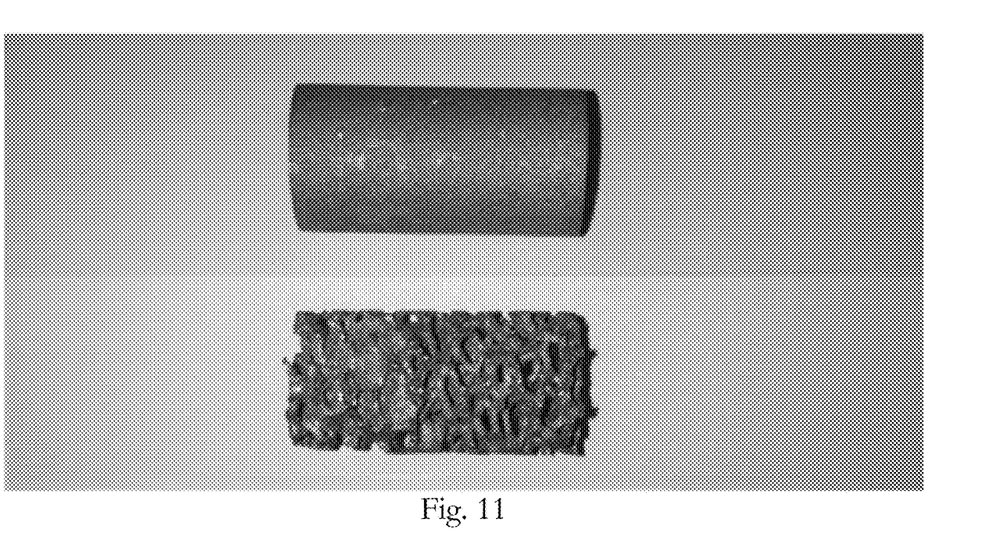
FIG. 11 is a picture of one embodiment of a skeletal composite material before (top image) and after (bottom image) it is exposed to a corrosive material that removes the matrix.

The skeletal composite material was immersed in 3% KCl solution at 93° C. until the matrix dissolved away to expose the skeleton structure shown in the bottom image of FIG. 11. This is an example of how the skeletal composite material can be used in a downhole as a sieve or catch basin.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The invention claimed is:

1. A skeletal composite material comprising:
   a skeleton structure positioned in a matrix, the skeleton structure being separate and distinct from the matrix;
   wherein the skeletal composite material is formed by solid-state consolidation of the skeleton structure and powder particles that form the matrix, the solid-state consolidation comprising in-situ shear deformation of the powder particles; and
   wherein the skeletal composite material is at least substantially free of inter-facial reactions between the powder particles as well as between the powder particles and the skeleton structure.

2. The skeletal composite material of claim 1 wherein the matrix includes at least 20 wt % metal.

3. The skeletal composite material of claim 1 wherein the matrix includes at least 20 wt % ceramic.

4. The skeletal composite material of claim 1 wherein the matrix includes a refractory metal.

5. The skeletal composite material of claim 1 wherein the matrix includes metals of essentially different electronegative potentials.

6. The skeletal composite material of claim 1 wherein the skeleton structure includes at least 20 wt % metal.

7. The skeletal composite material of claim 1 wherein the skeleton structure includes ceramic.

8. The skeletal composite material of claim 1 wherein the skeleton structure includes at least one of aluminum, magnesium, iron, ceramic, metal oxide, carbon, or refractory metal.

9. The skeletal composite material of claim 1 wherein the skeleton structure includes a metal mesh.

10. The skeletal composite material of claim 9 wherein the metal mesh has at least 5 pores per inch.

11. The skeletal composite material of claim 9 wherein the metal mesh is a reticulated metal mesh.

12. The skeletal composite material of claim 1 wherein the skeleton structure is substantially more ductile than the matrix.

13. The skeletal composite material of claim 1 wherein the skeleton structure is substantially more brittle than the matrix.

14. The skeletal composite material of claim 1 wherein the skeleton structure has a yield strength that is at least 50% higher than the matrix.

15. The skeletal composite material of claim 1 wherein the matrix has a fracture toughness that is at least 50% higher than the skeleton structure.

16. The skeletal composite material of claim 1 wherein the corrosion rate of the matrix is at least 20% higher than the corrosion rate of the skeleton structure.

17. The skeletal composite material of claim 1 wherein the corrosion rate of the skeleton structure is at least 20% higher than the corrosion rate of the matrix.

18. The skeletal composite material of claim 1 wherein the skeletal composite material is formed by non-isostatic solid-state consolidation of the skeleton structure and powder particles that form the matrix.

19. The skeletal composite material of claim 1 wherein the solid-state consolidation comprises simultaneously applying an axial pressure and a radial pressure where the axial pressure is greater than the radial pressure.

20. The skeletal composite material of claim 1 wherein the solid-state consolidation forms a fully dense microstructure.

21. The skeletal composite material of claim 1 wherein the skeletal composite material consists essentially of being free of inter-facial reactions between the powder particles as well as between the powder particles and the skeleton structure.

22. A method of making the skeletal composite material in claim 1 comprising:
    filling the skeleton structure with the powder particles, wherein the powder particles are made of metal, ceramic, carbon/graphite, refractory metal, or metal/ceramic composite;
    compacting the skeleton structure and the powder particles to form the matrix around the skeleton structure, the combination of the skeleton structure and the matrix forming a less than fully dense preform; and
    consolidating the preform to form the skeletal composite material in claim 1;
    wherein the compacting and consolidating steps are performed at temperatures low enough to prevent the skeleton structure and the matrix from substantially reacting with each other.

23. A fragmentation device comprising:
    a casing comprising the skeletal composite material of claim 1;
    an explosive material positioned inside or around the casing;
    wherein the skeleton structure is configured to preferentially fracture along the skeleton structure when the explosive material explodes.

24. A method comprising:
    positioning the skeletal composite material of claim 1 in a hole; and
    exposing the skeletal composite material to a corrosive material to remove the matrix and leave the skeleton structure in the hole;
    wherein the skeleton structure is resistant to corrosion by the corrosive material and the matrix is susceptible to corrosion by the corrosive material.

25. A method comprising:
    positioning the skeletal composite material of claim 1 in a first location; and exposing the skeletal composite material to a corrosive material to remove both the matrix and the skeleton structure;

wherein the skeleton structure is more susceptible to corrosion by the corrosive agent than the matrix.

* * * * *